US010679420B2

(12) United States Patent
Rudman et al.

(10) Patent No.: US 10,679,420 B2
(45) Date of Patent: Jun. 9, 2020

(54) AUGMENTED REALITY (AR) REMOTE VEHICLE ASSISTANCE

(71) Applicant: General Motors LLC, Detroit, MI (US)

(72) Inventors: Daniel E. Rudman, West Bloomfield, MI (US); Keith A. Fry, Rochester Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 16/179,019

(22) Filed: Nov. 2, 2018

(65) Prior Publication Data

US 2020/0143593 A1 May 7, 2020

(51) Int. Cl.
*G06T 19/00* (2011.01)
*G07C 5/08* (2006.01)
*G06K 9/00* (2006.01)
*G07C 5/00* (2006.01)

(52) U.S. Cl.
CPC ........ *G06T 19/006* (2013.01); *G06K 9/00671* (2013.01); *G07C 5/008* (2013.01); *G07C 5/0808* (2013.01); *G06T 2200/24* (2013.01)

(58) Field of Classification Search
CPC .................................................. G06T 19/006
See application file for complete search history.

(56) References Cited

U.S. PATENT DOCUMENTS

| 2004/0064762 | A1* | 4/2004 | Deshpande | G06F 11/0733 714/44 |
| 2004/0070674 | A1* | 4/2004 | Foote | H04N 7/18 348/207.99 |
| 2013/0135118 | A1* | 5/2013 | Ricci | H04W 4/90 340/932.2 |
| 2013/0218783 | A1* | 8/2013 | Anand | G06Q 10/20 705/304 |
| 2013/0301875 | A1* | 11/2013 | Schumacher | G06K 9/00 382/103 |
| 2013/0325970 | A1* | 12/2013 | Roberts | H04N 21/4788 709/206 |
| 2015/0347848 | A1* | 12/2015 | Gurovich | G06K 9/00671 382/104 |

(Continued)

*Primary Examiner* — Ryan McCulley
(74) *Attorney, Agent, or Firm* — Reising Ethington P.C.; David Willoughby

(57) ABSTRACT

A system and method of providing augmented reality (AR) remote assistance to a vehicle user of a vehicle. The method includes: sending live video data to a remote assistant application at a remote computer from a portable wireless device (PWD) that is local to the vehicle; receiving the annotation information at the mobile device from the remote assistant application, wherein the annotation information includes annotation graphic information and annotation location information, wherein the annotation graphic information identifies an annotation graphic; and displaying on the electronic display an AR video that includes the annotation graphic located at the annotation display location and over a portion of the live video data, wherein the AR video is updated as the field of view of the electronic camera changes so that the annotation graphic as displayed within the AR video appears fixed to a location within the field of view of the electronic camera.

17 Claims, 7 Drawing Sheets

(56) References Cited

U.S. PATENT DOCUMENTS

| | | | |
|---|---|---|---|
| 2015/0371455 A1* | 12/2015 | Abdel-Rahman | G06F 16/951 701/29.1 |
| 2016/0291922 A1* | 10/2016 | Montgomerie | G06T 19/006 |
| 2016/0358383 A1* | 12/2016 | Gauglitz | G06T 19/006 |
| 2017/0280188 A1* | 9/2017 | Mullins | H04N 21/4302 |
| 2018/0218538 A1* | 8/2018 | Short | G06T 19/006 |
| 2019/0158547 A1* | 5/2019 | Fink | G06Q 30/00 |

\* cited by examiner

AUGMENTED REALITY (AR) REMOTE VEHICLE ASSISTANCE

INTRODUCTION

The present invention relates to providing augmented reality (AR) assistance to a vehicle user using a portable wireless device (PWD).

Mobile devices, such as smartphones, can be associated with a vehicle and used to provide enhanced access to vehicle services. These devices may wirelessly communicate with the vehicle to provide local and/or remote access to vehicle data and functions. And, as vehicles continue to become more complex, the operation, servicing, and/or maintenance of the vehicle can be challenging to a vehicle user or vehicle service technician.

SUMMARY

According to one aspect of the invention, there is provided a method of providing augmented reality (AR) remote assistance to a vehicle user of a vehicle, the method including: sending live video data to a remote assistant application at a remote computer from a portable wireless device (PWD) that is local to the vehicle, wherein the PWD includes an electronic display and an electronic camera that captures the live video data within a field of view of the electronic camera, and wherein the remote computer is configured to: (i) receive vehicle diagnostic information concerning the vehicle, (ii) present the vehicle diagnostic information to a remote assistant, (iii) display the live video data for viewing by the remote assistant using the remote assistant application, (iv) receive an annotation input from the remote assistant, and (v) send annotation information to the PWD, wherein the annotation information is based on the annotation input; receiving the annotation information at the mobile device from the remote assistant application, wherein the annotation information includes annotation graphic information and annotation location information, wherein the annotation graphic information identifies an annotation graphic, and wherein the annotation location information identifies an annotation display location; and displaying on the electronic display an augmented reality (AR) video that includes the annotation graphic located at the annotation display location and over a portion of the live video data, wherein the AR video is updated as the field of view of the electronic camera changes so that the annotation graphic as displayed within the AR video appears fixed to a location within the field of view of the electronic camera.

According to various embodiments, this method may further include any one of the following features or any technically-feasible combination of some or all of these features:

- the annotation location information includes object marker information that is used to identify and/or track an object in three-dimensional space as observed by the electronic camera of the PWD so that the annotation graphic can be fixed to the object to provide the AR video;
- the annotation location information includes a pixel coordinate location of the live video data;
- the PWD identifies an object within three-dimensional space as observed by the electronic camera of the PWD, and wherein the PWD uses object recognition techniques to track the annotation graphic so that the annotation graphic appears fixed to the object;
- the PWD includes one or more inertial sensors that obtain position information concerning the PWD and wherein the position information is used to track an object or point within three-dimensional space as observed by the electronic camera of the PWD so that the annotation graphic appears fixed to the object or point within the three-dimensional space even as the PWD is repositioned;
- the position information includes orientation information and/or movement information concerning the PWD;
- live audio is streamed to the PWD from the remote computer, and wherein the live audio is captured by the remote computer using a microphone and streamed for playback at the PWD;
- displaying remote assistant live video data that is received from the remote computer, wherein the remote assistant live video data is video data that is captured at the remote computer and streamed in a live manner to the PWD for playback;
- the PWD provides the vehicle diagnostic information to the remote assistant application;
- sending a vehicle diagnostic information request to the vehicle from the PWD and, in response to sending the vehicle diagnostic information request, receiving a vehicle diagnostic information response at the PWD from the vehicle; and/or
- the vehicle diagnostic information request is sent and the vehicle diagnostic information response is received using a short-range wireless communication (SRWC) connection between the vehicle and the PWD.

According to another aspect of the invention, there is provided a method of providing augmented reality (AR) remote assistance to a vehicle user of a vehicle, wherein the method is carried out by a remote computer that includes a remote assistant application, and wherein the method includes: receiving live video data at the remote assistant application from a portable wireless device (PWD); displaying the live video data at a graphical user interface (GUI) of the remote assistant application so that live video data captured at the PWD is received and displayed at the GUI of the remote assistant application; presenting vehicle diagnostic information at the GUI of the remote assistant application; receiving an annotation input from a remote assistant via one or more human-machine interfaces at the remote computer; obtaining annotation information based on the annotation input; displaying an augmented reality (AR) video at the GUI of the remote assistant application, and wherein the AR video includes an annotation graphic that is generated based on the annotation information and/or the annotation input; and sending the annotation information and/or the AR video to the PWD.

According to various embodiments, this method may further include any one of the following features or any technically-feasible combination of some or all of these features:

- the sending step causes the AR video to be displayed on an electronic display of the PWD such that the AR video is displayed on the GUI of the remote assistant application and the electronic display of the PWD in a simultaneous manner;
- the vehicle diagnostic information is presented and the live video data is displayed at the GUI of the remote assistant application simultaneously;
- the GUI of the remote assistant application includes a live video data streaming portion, a vehicle operation or service guide portion, and one or more annotation tools, wherein the live video data and/or the AR video is displayed at the live video data streaming portion, wherein a vehicle operation or service guide is displayed at the vehicle operation or service guide portion, and wherein the annotation tools are selectable by the remote assistant and usable to input the annotation input;

the AR video is generated at the remote computer using object recognition techniques, and wherein the AR video includes the live video data received from the PWD and the annotation graphic overlaid or superimposed on a portion of the live video data;

the AR video is sent from the remote assistant application to the PWD;

the annotation information is sent to the PWD, and further comprising the step of receiving the AR video from the PWD;

the remote assistant application obtains the vehicle diagnostic information from a database located at a remote facility; and/or the remote assistant application obtains the vehicle diagnostic information from the vehicle using a direct remote connection between the vehicle and the remote computer.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enable a vehicle user to receive remote assistance from a remote assistant in the form of an augmented reality (AR) video. The vehicle user, which is an individual located at and/or associated with a vehicle, can request assistance from a remote assistant, which is an individual located at a remote facility and that provides remote assistance to vehicle users. In one scenario, the vehicle user is a primary vehicle operator, such as an owner or a lessee; in another scenario, the vehicle user is a vehicle service technician or mechanic. The vehicle user can use a portable wireless device (PWD), such as a smartphone, to request assistance using a vehicle assistance application installed on the PWD. A remote assistant can then join a remote assistance session with the vehicle user. The PWD can capture video data and stream this live video data to the remote assistant application that is operated by the remote assistant. The remote assistant application can also obtain vehicle information concerning the vehicle, which aids the remote assistant in determining a problem with the vehicle, or otherwise assisting the vehicle user with service, maintenance, or other operation of the vehicle. The remote assistant application can include a graphical user interface (GUI) that enables the remote assistant to view the live video data from the PWD as it is streamed in real time as well as enables the remote assistant to annotate the live video data with annotation graphics (e.g., text, circles, arrows, other graphics). The annotation graphics (or annotation information that can be used by the PWD to obtain the annotation graphics) is sent to the PWD from the remote assistant application and, then, an augmented reality (AR) video is displayed at the PWD so as to assist the user with operation, service, or maintenance of the vehicle. The annotation graphics can be presented in an AR manner such that each annotation graphic is associated with (or tracks) an object in three-dimensional space as observed by the camera and presented in the live video data.

Figure 1:
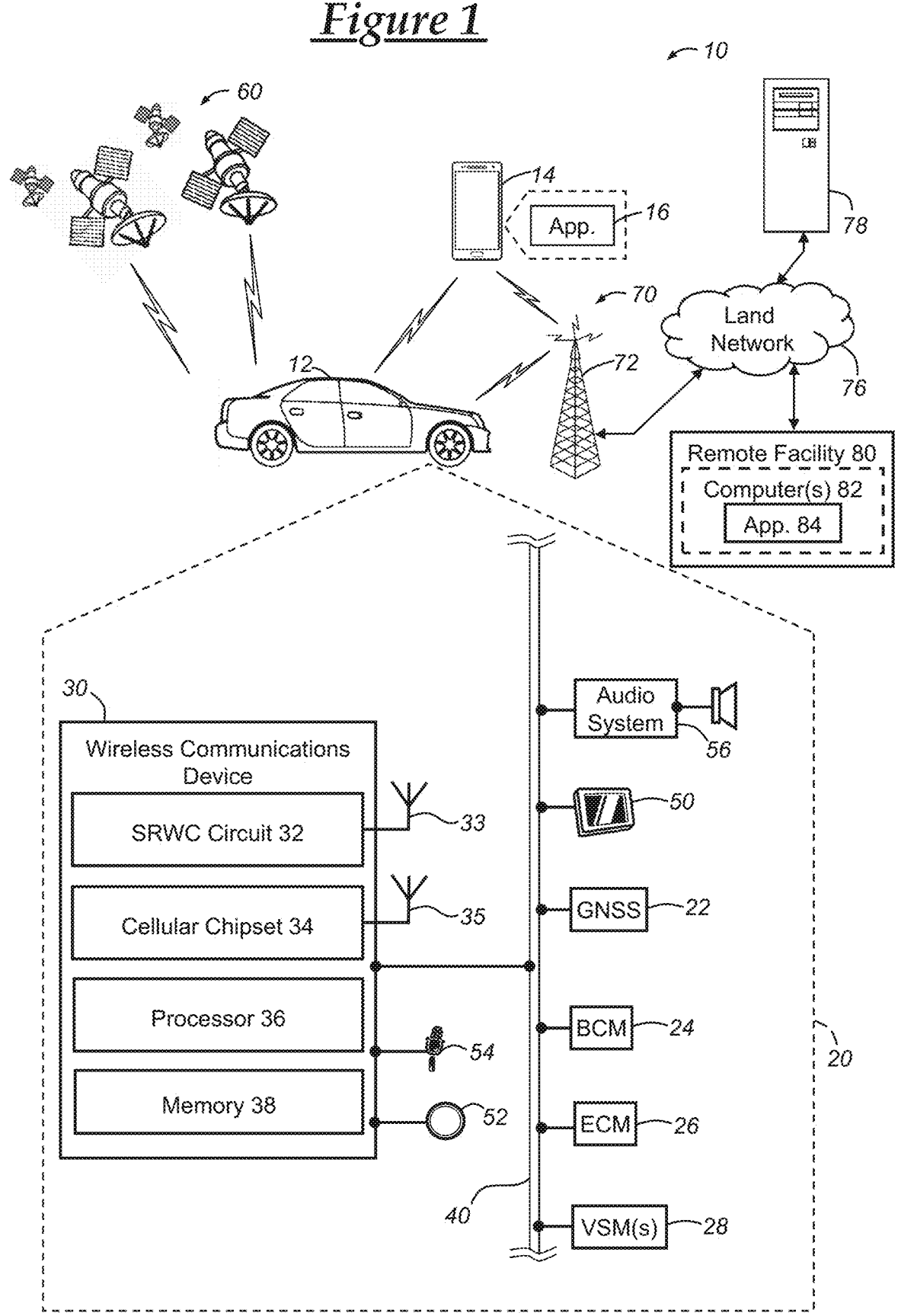
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-56, a portable wireless device (PWD) 14 with a vehicle assistance application 16, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, the wireless communications device 30, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, the BCM 24, the ECM 26, the wireless communications device 30, and the vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 can be connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 60. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22. The GNSS receiver 22 can determine a geographical position of the vehicle and this position can be stored and/or reported to a remote device, such as computer 78 or computers/servers 82 at remote facility 80.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with another module of the vehicle electronics 20. The BCM 24 can include a processor and/or memory, which can be similar to processor 36 and memory 38 of wireless communications device 30, as discussed below. The BCM 24 may communicate with wireless device 30 and/or one or more vehicle system modules, such as the engine control module (ECM) 26, audio system 56, or other VSMs 28. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request to perform a particular operation or a request for vehicle sensor data and, in response, the sensor may then send back the requested information. And, the BCM 24 may receive vehicle sensor data from VSMs, including battery sensor data or other sensor data from one or more onboard vehicle sensors, and various other information or data from other VSMs. Additionally, the BCM 24 may provide vehicle state information corresponding to the vehicle state of certain vehicle components or systems, including the VSMs discussed herein. For example, the BCM 24 may provide the device 30 with information indicating whether the vehicle's ignition is turned on (as received from ECM 26, for example), the gear the vehicle is presently in (i.e. gear state), and/or other information regarding the vehicle. Or, in another example, the BCM 24 can receive, determine, or otherwise obtain vehicle diagnostic information, such as diagnostic trouble codes (DTCs) that relate to one or more VSMs or subsystems of the vehicle. Vehicle diagnostic information can include information based on sensor values or information from one or more onboard vehicle sensors and/or state(s) of one or more VSMs of the vehicle 12, which can include DTCs, for example. Also, the vehicle diagnostic information can include vehicle prognostic information, which is information that represents a prognosis of the vehicle as determined based on information concerning one or more states of one or more VSMs of the vehicle 12. This vehicle diagnostic information can be stored in memory of the BCM 24 or other memory of the vehicle electronics 20, such as memory 38 of the wireless communications device 30. Additionally, this vehicle diagnostic information can be sent to a non-vehicle device, such as PWD 14 and/or remote facility 80.

Engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM to start the vehicle—i.e., initiate the vehicle ignition or other primary propulsion system (e.g., a battery powered motor). In another scenario, the ECM 26 can report vehicle diagnostic information concerning the engine or primary propulsion system to the BCM 24 or other VSM. In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information).

The vehicle 12 can include various onboard vehicle sensors, which includes certain vehicle-user interfaces 50-54 that can be utilized as onboard vehicle sensors. Generally, the sensors can obtain vehicle sensor data, which can include vehicle sensor values as measured or determined by the onboard vehicle sensor. Other information pertaining to either the operating state of the vehicle (the "vehicle operating state") or the environment of the vehicle (the "vehicle environmental state") can also be obtained or may be included in the vehicle sensor data. The vehicle sensor data can be sent to other VSMs, such as BCM 24 and the vehicle communications device 30, via communications bus 40. In one embodiment, the sensor data can be evaluated by one or more VSMs (e.g., wireless communications device 30, BCM 24) to determine or obtain vehicle diagnostic information. Also, in some embodiments, the vehicle sensor data (and/or vehicle diagnostic information) can be sent with metadata, which can include data identifying the sensor (or type of sensor) that captured the vehicle sensor data, a timestamp (or other time indicator), and/or other data that pertains to the vehicle sensor data or vehicle sensor. The "vehicle operating state" refers to a state of the vehicle concerning the operation of the vehicle, which can include the operation of the primary mover (e.g., a vehicle engine, vehicle propulsion motors). The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In one embodiment, the wireless communications device 30 can be or include a telematics unit (or telematics control unit) that is capable of carrying out cellular communications using one or more cellular carrier systems 70. Or, in other embodiments, a separate telematics unit can be included in the vehicle and communicatively coupled to the wireless communications device 30 directly and/or via the communications bus 40. Also, in some embodiments, the wireless communications device 30 and/or the telematics unit can be integrated with the GNSS receiver 22 so that, for example, the GNSS receiver 22 and the wireless communications device 30 (or telematics unit) are directly connected to one another as opposed to being connected via communications bus 40.

In some embodiments, the wireless communications device 30 can be configured to communicate wirelessly according to one or more short-range wireless communications (SRWC) such as any of the Wi-Fi™, WiMAX™, Wi-Fi Direct™, IEEE 802.11p, other vehicle to vehicle (V2V) communication protocols, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals. The SRWC circuit 32 may allow the device 30 to connect to another SRWC device, such as the PWD 14. Additionally, in some embodiments, the wireless communications device 30 contains cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

The wireless communications device 30 may enable vehicle 12 to be in communication with one or more remote networks (e.g., one or more networks/devices at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. Memory 38 may be a non-transitory computer-readable medium, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. The wireless communications device 30 can interface various VSMs of the vehicle 12 with one or more devices external to the vehicle 12, such as one or more networks or systems at remote facility 80 or the PWD 14.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface"

broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information and that can obtain vehicle sensor data for use in various embodiments of the method(s) below. The pushbutton(s) 52 allow manual user input into the communications device 30 to provide other data, response, and/or control input (e.g., a windshield wiper activation or control switch). Audio system 56 provides audio output to a vehicle occupant and can be a dedicated, stand-alone system or part of the primary vehicle audio system. According to a particular embodiment, audio system 56 is operatively coupled to both vehicle bus 40 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch-screen on the instrument panel, a heads-up display reflected off of the windshield, or a projector that can project graphics for viewing by a vehicle occupant. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be some of a number of computers accessible via a private or public network such as the Internet. And, the computers 78 (only one shown in FIG. 1) can be used for one or more purposes, and can be, for example: a service center computer where vehicle diagnostic information and other vehicle data can be uploaded from the vehicle; a client computer used by the vehicle owner or other subscriber for various purposes, such as accessing and/or receiving vehicle sensor data (or other data), as well as setting up and/or configuring subscriber preferences or controlling vehicle functions; a car sharing server which coordinates registrations from a plurality of users who request to use a vehicle as part of a car sharing service; or a third party repository to or from which vehicle sensor data or other information is provided, whether by communicating with the vehicle 12, PWD 14, remote facility 80, or both. Those skilled in the art will appreciate that, although only one computer 78 is depicted in the illustrated embodiment, numerous computers 78 may be used.

Vehicle backend services facility 80 is a remote facility, meaning that it is located at a physical location that is located remotely from vehicle 12. The remote facility 80 includes one or more servers 82 that can store and/or execute a remote assistant application 84. The vehicle backend services facility 80 (or "remote facility 80" for short) may be designed to provide the vehicle electronics 20 with a number of different system back-end functions through use of one or more electronic servers. The remote facility 80 includes vehicle backend services servers and databases, which may be stored on a plurality of memory devices. Also, remote facility 80 can include one or more switches, one or more live advisors, and/or an automated voice response system (VRS), all of which are known in the art. The remote facility 80 may include any or all of these various components and, in some embodiments, each of the various components are coupled to one another via a wired or wireless local area network. The remote facility 80 may receive and transmit data via a modem connected to land network 76. Data transmissions may also be conducted by wireless systems, such as IEEE 802.11x, GPRS, and the like.

Remote facility 80 can carry out one or more embodiments of the method(s) discussed herein. Although only a single vehicle backend services facility 80 is illustrated, numerous vehicle backend services facilities can be used and, in such a case, the functionality of the numerous vehicle backend services facilities can be coordinated so that the vehicle backend services facilities can act as a single back-end network or so that the operation of each facility is coordinated with the operation of the other facilities. And, the servers can be used to provide information stored in the databases to various other systems or devices, such as vehicles 12 or the PWD 14.

The remote facility 80 can include one or more databases (not shown) that can be stored on a plurality of memory. The databases can store information concerning one or more vehicles, types of vehicles (e.g., vehicles of a particular model and/or model-year), vehicle diagnostic information, and/or other vehicle-related information. For example, the vehicle diagnostic information can include diagnostic histories of various vehicles, diagnostic troubleshooting information or guides, and/or other information that can be used by a remote assistant or vehicle user to operate a vehicle or troubleshoot a problem with the vehicle.

The remote assistant application 84 can be executed on one or more computers 82 of the remote facility 80. The remote assistant application 84 can present a graphical user interface (GUI) to a remote assistant that is stationed at the remote facility 80. The remote assistant application 84 can be used to establish a remote connection with the PWD 14 and/or the vehicle electronics 20 of the vehicle 12. In one embodiment, the remote assistant application 84 can receive live video data from the PWD 14 and can present this received live video data on a display located at the computer 82 using the GUI of the remote assistant application 84. Also, the remote assistant application 84 can receive information from the vehicle electronics 20 of the vehicle 12, such as vehicle diagnostic information. In one embodiment, the remote assistant application 84 can send a vehicle diagnostic information request to the vehicle electronics 20 and, in response, the vehicle electronics 20 can obtain and send vehicle diagnostic information to the remote assistant application 84. In one embodiment, the PWD 14 can facilitate communications between the vehicle electronics 20 and the remote assistant application 84—for example, the PWD 14 can be co-located with the vehicle 12 and can establish a short-range wireless communications (SRWC) connection (e.g., Bluetooth™ connection) with the wireless communications device 30 and, then, the vehicle electronics 20 can send information via the SRWC connection to the PWD 14, which can then forward this information to the remote assistant application 84. In other embodiments, the vehicle electronics 20 can establish a separate remote connection with the remote assistant application 84 without using the PWD 14.

Figure 2:
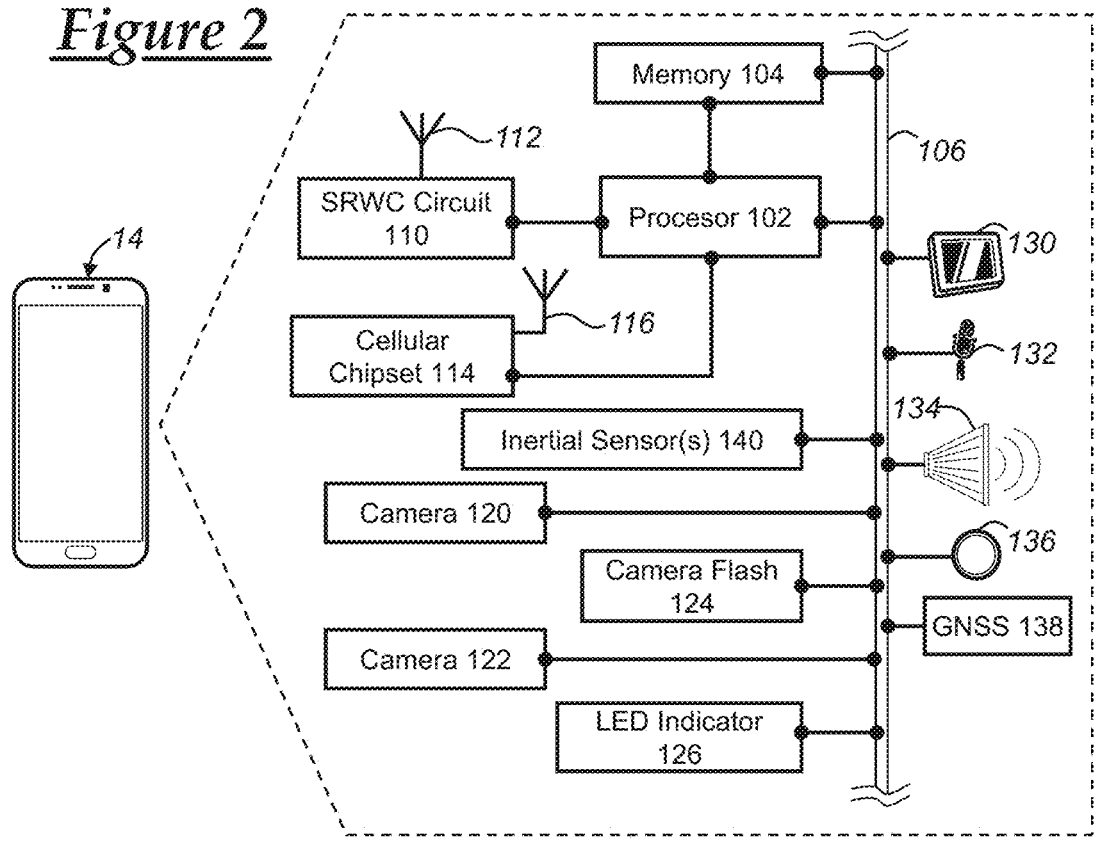
FIG. 2 is a block diagram depicting an embodiment of a portable mobile device and illustrates some exemplary hardware and components of the portable mobile device.
Figure 3:
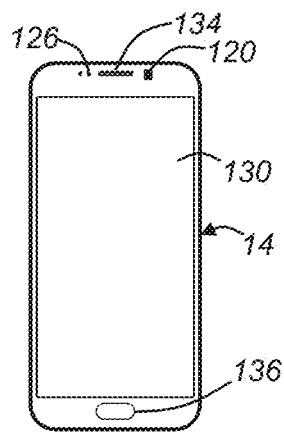
FIG. 3 is a block diagram depicting a front view of the portable device of FIG. 2 where the device is depicted as front-facing.
Figure 4:
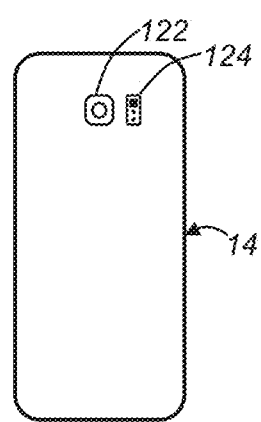
FIG. 4 is a block diagram depicting a rear view of the portable device of FIG. 2 where the device is depicted as rear-facing.

With reference to FIGS. 2-4, there is shown a schematic view of the hardware and components of a portable wireless device 14 (PWD) (FIG. 2), along with a front view (FIG. 3) and a back view (FIG. 4) of the PWD 14. PWD 14 is shown as a smartphone having cellular telephone capabilities; however, in other embodiments, PWD 14 may be a tablet, a wearable electronic device (e.g., a smartwatch or an electronic ocular device), or any other suitable device. As used herein, a portable wireless device (PWD) is a device that is capable of network communications and that is portable by a user, such as a wearable device (e.g., a smartwatch), an implantable device, or a handheld device (e.g., a smartphone, a tablet, a laptop). The PWD includes: hardware, software, and/or firmware enabling cellular telecommunications and/or short range wireless communications (SRWC), as well as other wireless device functions and applications. The hardware of PWD 14 comprises a processor 102, memory 104, wireless chipsets/circuits 110,114, antennas 112,114, cameras 120,122, GNSS module 138, inertial sensor(s) 140, and various user-device interfaces.

Processor 102 can be any type of device capable of processing electronic instructions and can execute such instructions that may be stored in memory 104, such as those devices and types of instructions discussed above with respect to processor 32 in wireless communications device 30. For instance, processor 102 can execute programs or process data to carry out at least a part of the method discussed herein. The processor may also execute an operating system for the PWD, such as Android™, iOS™, Microsoft™ Windows™, and/or other operating systems. The operating system may provide a user interface and a kernel, thereby acting as a central control hub that manages the interfacing between the hardware and software of the PWD. Moreover, the operating system may execute mobile applications, software programs, and/or other software or firmware instructions. In one embodiment, the processor can execute the vehicle assistance application 16 (FIG. 1) that enables a user to request and receive remote assistance from a remote assistant.

Memory 104 may include a non-transitory computer-readable medium, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. In other embodiments, memory 104 may be a non-volatile memory card, such as a Secure Digital™ (SD) card, that is inserted into a card slot of PWD 14.

The processor 102 and/or memory 104 may be connected to a communications bus 106, which allows for the communication of data between the processor and other components of the PWD 14, such as cameras 120,122, camera flash 124, LED indicator 126, visual display 130, microphone 132, speaker 134, pushbutton 136, GNSS module 138, inertial sensor(s) 140, and various other components. The processor 102 may provide processing power for such components and/or may, through the operating system, coordinate functionality of the components, while the memory 104 may allow for storage of data that may be usable by such components. For example, the processor may run the primary operating system for the PWD 14, which may include displaying a graphical user interface (GUI) on a touchscreen display 130. In such an example, the GUI may include the display of images that may be stored in memory 104. The PWD processor and software stored in the memory also enable various software applications, which may be preinstalled or installed by a user or by a manufacturer. This may include a vehicle assistance application 16 (FIG. 1) that can allow the PWD 14 to connect with the remote assistant application 84 and/or vehicle electronics 20. This vehicle assistance application 16 may use one or more of the components of the PWD 14, such as display 130, front-facing camera 120, rear-facing camera 122, GNSS module 138, accelerometer 140, and speaker 134, as will be discussed in more detail below.

The PWD 14 includes a short range wireless communications (SRWC) chipset 110 and SRWC antenna 112, which allows it to carry out SRWC, such as any of the IEEE 802.11 protocols, WiMAX™, ZigBee™, Wi-Fi Direct™, Bluetooth™, or near field communication (NFC). The SRWC chipset may allow the PWD 14 to connect to another SRWC device.

Additionally, PWD 14 contains a cellular chipset 114 thereby allowing the PWD to communicate via one or more cellular protocols, such as GSM/GPRS technology, CDMA or CDMA2000 technology, and LTE technology. PWD 14 may communicate data over wireless carrier system 70 using the chipset 114 and cellular antenna 116. Although the illustrated embodiment depicts a separate chipset and antenna for SRWC and cellular communications chipsets, in other embodiments, there may be a single antenna for both chipsets, a single chipset and multiple antennas, or both a single chipset and a single antenna. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Global Navigation Satellite System (GNSS) receiver 138 receives GNSS signals from a constellation of GNSS satellites 60 (FIG. 1). From these signals, the module 138 can determine the position of the PWD 14, which may enable the device to determine whether it is at a known location, such as home or workplace, and/or whether the PWD 14 is co-located with the vehicle 12. The GNSS module 138 may be similar to the GNSS module 22 provided in the vehicle electronics, and may provide similar functionality to the mobile PWD 14.

Cameras 120 and 122 may be digitals cameras that are incorporated into PWD 14 and that enable PWD 14 to digitally capture images and videos. As shown in FIG. 3, camera 120 may be a front-facing camera, meaning that the camera faces an area in front of the front-side of the PWD 14—the front side of the PWD 14 can be that side that includes the main or primary visual display, which is display 130 in the illustrated embodiment. Since an operator of a PWD 14 generally holds or positions the PWD so that the visual display is in view, camera 120 in such an arrangement may face the operator, thereby allowing the operator to capture images and video of the operator (e.g., selfies) and/or behind and surrounding the operator. As shown in FIG. 4, camera 122 is a rear-facing camera, meaning that the camera faces an area away from the front side of the PWD. Thus, in such an arrangement of usual use of the PWD as described above, the camera may capture images or video of an area in front of the operator. In another embodiment, multiple cameras may be located on the PWD 14 such that the cameras capture images or video of the same area or at least part of the same area. In yet another embodiment, a stereo camera (or stereoscopic camera) or other camera with multiple lenses or separate image/vision sensors may be used. In either of such embodiments, the camera(s) may be used to capture more information pertaining to the captured area, such as three-dimensional characteristics (e.g., distances of objects in the captured area), as will be known by those skilled in the art.

In some embodiments, the images or video captured by the camera may be displayed on visual display 130 even when the user is not presently capturing images or recording videos to be stored, thereby allowing the user to view the area that is being captured by the camera on the display. The image or video (or data thereof) that is captured by the camera and immediately displayed on the display 130 can be referred to as live video data. Also, the PWD 14 may overlay or dispose certain graphical objects over the displayed camera feed to achieve an augmented reality (AR) video, as will be discussed more below. In addition, the cameras may each include a camera flash, such as camera flash 124 which is shown in FIG. 4 to be primarily for use with rear-facing camera 122; however, such camera flash 124 or other camera flashes (not shown) may be used for other purposes such as for providing light in dark or low-light environments or providing a warning or other indicator to gain the attention of nearby persons.

PWD 14 also includes a number of user-device interfaces that provide users of the PWD with a means of providing and/or receiving information. As used herein, the term "user-device interface" (or "machine-user interface"), when used to refer to components of the PWD, broadly includes any suitable form of electronic device, including both hardware and software components, which is located on the PWD and enables a user of the PWD to communicate with the PWD. Such examples of user-device interfaces include indicator 126, visual display (or touchscreen) 130, microphone 132, speaker 134, and pushbutton(s) 136. Indicator 126 may be one or more light indicators, such as light emitting diodes (LEDs), and, in some embodiments, may be located on a front-face of the PWD 14, as shown in FIG. 3. The indicator may be used for numerous purposes, such as to indicate to an operator of PWD 14 that there is a new notification on the PWD. Visual display or touch screen 130 is, in many embodiments, a graphics display, such as a touch screen located on the front face of the PWD 14, as shown in FIG. 3, and can be used to provide a multitude of input and output functions. Microphone 132 provides audio input to the PWD 14 to enable the user to provide voice commands and/or carry out hands-free calling via the wireless carrier system 70. Speaker 134 provides audio output to a vehicle occupant and can be a dedicated, stand-alone system or part of the primary device audio system. The pushbuttons 136 (only one shown) allow manual user input to provide other data, response, or control input. Other pushbuttons may be located on the PWD 14, such as a lock button on the side of the PWD 14, up and down volume controls, camera buttons, etc. Additionally, as those skilled in the art will appreciate, the pushbutton(s) do not need to be dedicated to a single functionality of the PWD 14, but may be used to provide interfacing means for a variety of different functionality. Various other vehicle user interfaces can also be utilized, as the interfaces of FIGS. 2-4 are only an example of one particular implementation.

The inertial sensors 140 can be used to obtain sensor information concerning the magnitude and direction of acceleration of the PWD 14 as well as angular information concerning the orientation of the PWD 14. The inertial sensors can be microelectromechanical systems (MEMS) sensors, accelerometers, or gyroscopes that obtains inertial information, which can be (or be used to obtain) position information. The inertial sensors 140 can be used to determine or obtain orientation information concerning the PWD 14 and/or movement information concerning the PWD 14. The orientation information is information that represents an orientation of the PWD 14 with respect to a reference point or plane, such as the earth. The movement information is information that represents movement of the PWD 14. The movement information, the orientation information, and the live video data (or other captured image/video data) can be used to track the location of various objects within the field of view of the camera(s) 120,122. This enables the PWD 14 to carry out augmented reality (AR) features, which can include displaying annotation graphics that are provided from the remote assistant application 84, as will be explained in more detail below.

In at least one embodiment, the PWD 14 can include image processing techniques that can be used to recognize one or more objects that are in the field of view of cameras 120 and/or 122. Such techniques may be known to those skilled in the art, and may include recognizing vehicles, parts or components of the vehicle, street signs, traffic signals, pedestrians, sidewalks, roadways, and/or other objects within the field of view of the cameras. For example, in one embodiment, the PWD 14 can use object recognition techniques to identify one or more parts of the vehicle 12, such as a terminal of a vehicle battery, an oil dipstick handle, an oil cap, vehicle lights (e.g., headlights), a brake fluid cap, other components or parts found under the hood of a vehicle, other components or parts of the vehicle that are to be or may need to be serviced, etc. In some embodiments, these image processing techniques (e.g., object recognition techniques) can be used in conjunction with the movement information and/or the orientation information to carry out the AR functionality of the PWD 14.

Figure 5:
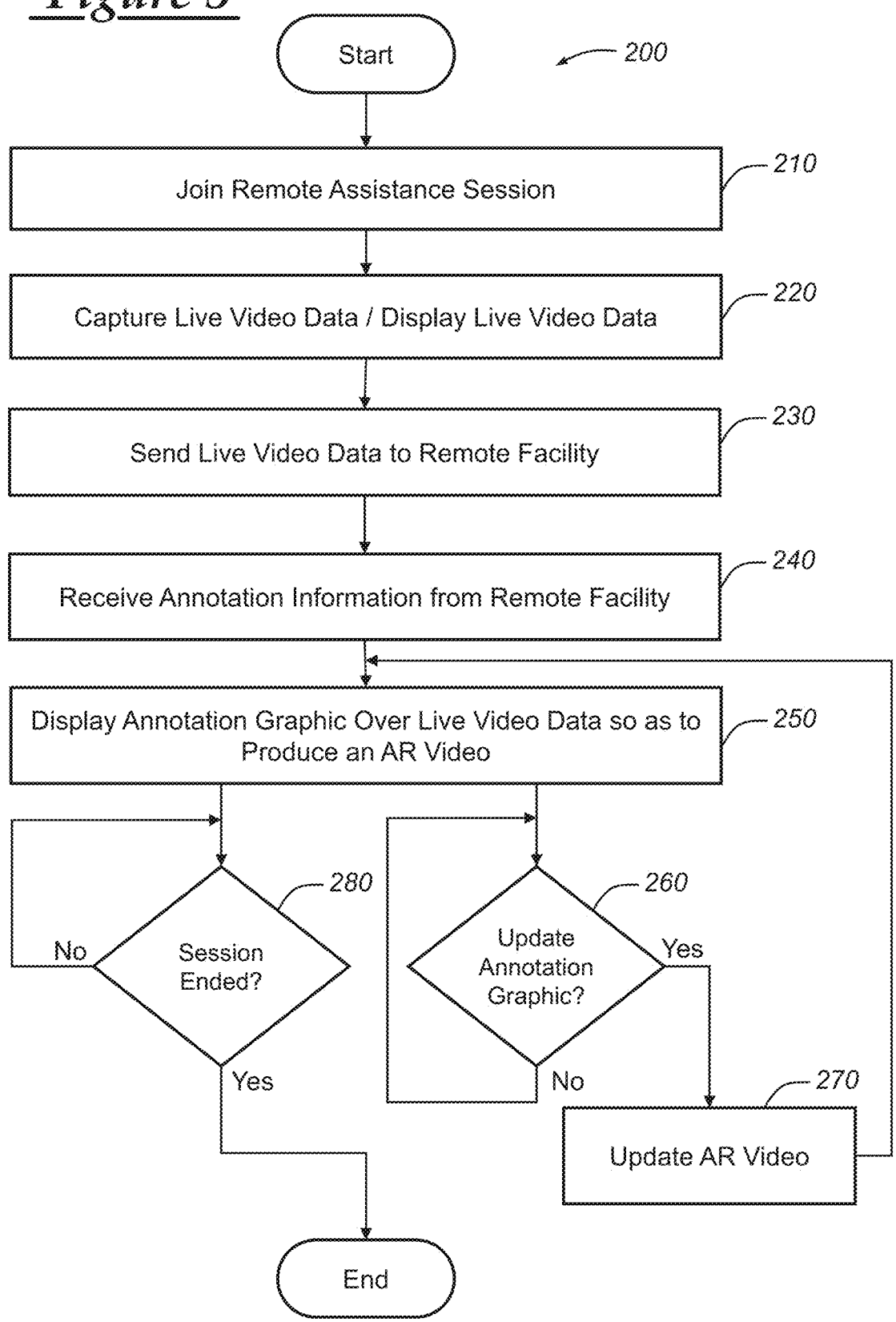
FIG. 5 is a flowchart depicting an embodiment of a method of providing augmented reality (AR) remote assistance to a vehicle user of a vehicle.

With reference to FIG. 5, there is shown an embodiment of a method 200 of assisting user engagement of vehicle features. In one embodiment, the method 200 can be carried out by a portable wireless device (PWD), such as the PWD 14. Although the steps of the method 200 are described as being carried out in a particular order, it is hereby contemplated that the steps of the method 200 can be carried out in any suitable order as will be appreciated by those skilled in the art.

The method 200 begins with step 210, wherein the portable wireless device (PWD) joins a remote assistance session with a remote assistant application. In one embodiment, the vehicle assistance application 16 of the PWD 14 can be used to initiate a remote assistance session with the remote assistant application 84 of the remote computer 82 that is located at a remote facility 80. A remote assistant, which is an individual that operates the remote assistant application 84 and provides assistance to a vehicle user, can receive a request or indication of a remote assistance session. The remote assistant can join the remote assistance session, or the remote assistant application 84 can automatically join or be assigned a remote assistance session. The vehicle user, which can be a vehicle owner, a vehicle lessee, a vehicle technician, or other individual servicing or requesting assistance with the vehicle, can input certain identification information into the vehicle assistance application 16 of the PWD 14 so that the remote assistant application 84 can identify the vehicle user and/or the vehicle 12. For example, the vehicle 12 can be associated with an account or subscription held by the vehicle user and, when the vehicle user logs into (or provides credentials to) the vehicle assistance application 16 of the PWD 14, vehicle information concerning the vehicle 12 can be provided to the remote assistant application 84 and used to identify the vehicle user or vehicle.

In at least one embodiment, the vehicle electronics 20 of the vehicle 12 can connect to the remote assistance session, or can otherwise provide vehicle information to the remote assistant application 84. In one embodiment, the remote assistant application 84 can identify the vehicle 12 as discussed above and, then, can establish a remote connection to the vehicle 12. The remote assistant application 84 can then request certain information from the vehicle electronics 20, such as vehicle diagnostic information, a vehicle operating state, a vehicle environmental state, and/or other vehicle information. In one embodiment, the vehicle user can use the application 16 to permit the remote assistant to access the vehicle electronics (or vehicle computer system) so as to obtain information and/or carry out vehicle operations. In another embodiment, the vehicle electronics 20 can connect with the PWD 14, which is co-located with the vehicle, using SRWC—for example, the wireless communications device 30 and the SRWC circuit 110 of the PWD 14 can establish a SRWC connection. Then, the PWD 14 can request certain vehicle information, such as vehicle diagnostic information or other vehicle state information, from the vehicle electronics 20. The vehicle electronics 20 can then respond by providing the requested information via the SRWC connection. The PWD 14 can then send this information to the remote facility 80 and, specifically, for example, to the remote assistant application 84. In one embodiment, the remote assistant application 84 can send a vehicle information request (i.e., a request for vehicle information) to the PWD 14, which can then forward the vehicle information request to the vehicle electronics 20. The PWD 14 then can receive a vehicle information response from the vehicle electronics 20 and can then provide this received vehicle information to the remote assistance application 84. The method 200 continues to step 220.

Figure 7:
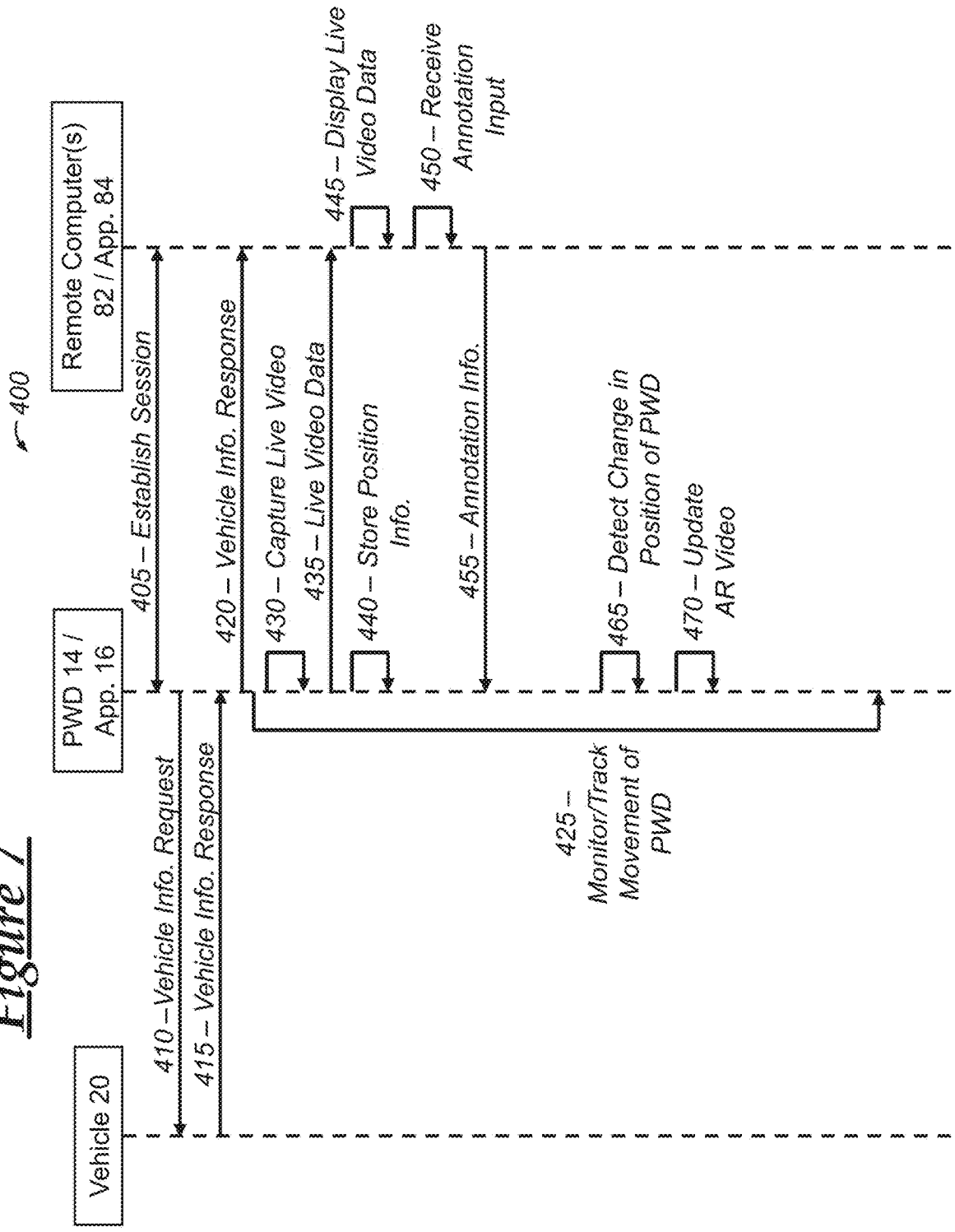
FIG. 7 is a flowchart depicting yet another embodiment of a method of providing augmented reality (AR) remote assistance to a vehicle user of a vehicle.

In step 220, video data is captured by the portable wireless device (PWD) and displayed on a display of the PWD. In one embodiment, the PWD 14 can use camera 122 to capture video data and the captured video data can be displayed on display 130 of the PWD 14 as the video data is being captured—displaying this video data as the video data is being captured can be referred to as displaying live video data. The captured video data can also be stored to memory 104 of the PWD 14 and/or processed using processor 102. The captured video data can be associated with a timestamp (or other time indicator) that reflects a time in which the video data was captured. Additionally, in some embodiments, orientation information and/or movement information can be determined or otherwise obtained at the time of capturing the live video data. In one embodiment, this information can be obtained using inertial sensor(s) 140 of the PWD 14. This orientation information and/or movement information can be collectively referred to as position information—that is, position information can include either or both of orientation information or movement information. This position information can be associated with a timestamp (or other time indicator) that reflects a time in which the position information was recorded or otherwise obtained. Moreover, the position information can be associated with certain video data based on the timestamp (or other time indicator)—for example, position information and video data can be associated based on a determination that the position information was determined at the same or similar time as that time at which the video data was captured. In some embodiments, the position information can be initialized to an initial recordation point that is associated with the first-captured video data, as discussed more below with respect to the method 400 (FIG. 7). The method 200 continues to step 230.

In step 230, the live video data is sent to the remote assistance application. The live video data can be sent or streamed to the remote assistance application 84 at the time that the live video data is captured so that the live video data can be displayed at the remote computer 82 in real-time. For example, the PWD 14 can send the video data to the remote assistance application 84 via the cellular network 70 and the land network 76. Various remote video or data streaming techniques can be used as appreciated by those skilled in the art. The live video data can continuously be captured by the PWD 14, stored at the PWD 14, and sent to the remote assistance application 84 at the remote computer 82 during steps 240 through 280. The method 200 proceeds to step 240.

In step 240, annotation information is received from the remote assistance application. The annotation information can include an annotation graphic information and annotation location information. The annotation graphic information is information that is (or at least can be) used to obtain an annotation graphic. The annotation graphic can be a graphic that is used to annotate the live video data so that the vehicle user can be provide with an augmented reality (AR) video. The annotation graphic can be generated and/or configured by the remote assistant using the remote assistance application 84. In at least some embodiments, the annotation graphic can be provided by the remote assistant for purposes of assisting the vehicle user with operation or maintenance of the vehicle. In one embodiment, the annotation graphic information includes image or video data representing the annotation graphic. In another embodiment, the annotation graphic information includes an annotation graphic identifier that is used to identify a particular graphic that is to be displayed at the PWD 14 as a part of the AR video. In one embodiment, the annotation graphic identifier can be used to recall the annotation graphic or data representing the annotation graphic from memory of the PWD 14, such as from memory 104. In another embodiment, the PWD 14 can request the annotation graphic from a remote server, such as a server at remote facility 80 or computer 78, which can then provide the requested annotation graphic to the PWD 14.

The annotation location information is information that is used to identify an annotation display location for the annotation graphic. As mentioned above, the annotation graphic is used to annotate the live video data that is being displayed on the display of the PWD 14 (see step 220). The annotation location information can specify a location within the live video data at which the graphic is to be displayed. In one embodiment, the annotation location information can include a coordinate location (e.g., a pixel coordinate (x,y), which is an example of an annotation graphic location) along the display (or within the live video data) at which the annotation graphic is to be rendered. In another embodiment, the annotation location information can include object marker information that is used by the PWD to identify an object with the field of view of the camera 122 that is capturing the live video data. For example, this object marker information is processed along with the live video data using object recognition techniques to identify the object that is represented by the object marker information. Once the object is identified within the live video data (or the field of view of the camera), a coordinate pixel location can be determined—that is, an annotation graphic location is determined. The annotation location information and/or the annotation graphic information can be stored on memory 104. The method 200 continues to step 250.

In step 250, the annotation graphic is displayed over a portion of the live video data so as to produce an augmented reality (AR) video. The annotation graphic can be rendered at the annotation graphic location as determined using the annotation location information. For example, the live video data can be displayed (step 220) and, then, the annotation graphic can be rendered on top of (or overlaid upon) the live video data at the annotation graphic location. Those skilled in the art will appreciate various AR processing techniques that can be used to display the annotation graphic on the live video data in this manner. The method 200 continues to step 260.

In step 260, it is determined whether the annotation graphic is to be updated. In at least some embodiments, it can be determined to update the annotation graphic when the field of view of the camera changes and/or when the position of the PWD 14 changes. For example, the PWD 14 can keep track of the position of the PWD 14 by continuously recording position information as determined using one or more sensors, such as the inertial sensors 140 and/or the cameras 120,122. In one embodiment, the position information can include orientation information and movement information. The orientation information can be represented by an azimuth angle and an elevation angle, which can be determined through use of an accelerometer or other inertial sensor 140 as appreciated by those skilled in the art. The movement information can zeroed or initialized when the live video data is first captured and can be tracked so that the PWD 14 can determine the manner (e.g., the magnitude and direction) in which the PWD 14 has moved from the initial position. The position information can be used to inform the PWD 14 of how the annotation graphic should be updated—that is, the annotation graphic location can be determined based on the initial annotation graphic location and on the position information as it is tracked by the inertial sensor(s) 140. In another embodiment, the PWD 14 can determine to update the annotation graphic by detecting that the field of view of the camera 122 has changed through using image processing techniques, as is appreciated by those skilled in the art. When it is detected that the annotation graphic is to be updated, the method 200 continues to step 270; otherwise, the method 200 continues to monitor for changes in the field of view or movement or other repositioning of the PWD 14.

In step 270, the AR video is updated. In one embodiment, updating the AR video includes determining an annotation graphic location for the annotation graphic. In one embodiment, the PWD 14 can use object recognition techniques to identify an object within the live video data. The object recognition techniques can be used to determine an annotation graphic location within the live video data. In another embodiment, the PWD 14 can obtain current position information through use of inertial sensor(s) 140 (for example) and, then, compare this current position information with initial or previously recorded position information to determine an annotation graphic location. Those skilled in the art will know how to track objects within three-dimensional space through use of inertial sensors or other movement/orientation sensors.

In addition to determining an update annotation graphic location, updating the AR video can further (or alternatively) include determining an annotation graphic orientation. For example, the annotation graphic can be a three-dimensional object and based on movement of the PWD 14, the orientation of the annotation graphic can be updated so that the parallax of the annotation graphic is consistent with the movement and/or viewing angle of the camera. This can include recalling or generating new data for the annotation graphic. Once the annotation graphic location and/or annotation graphic orientation is updated, the method 200 continues to step 250 where the annotation graphic is displayed. Although steps 260 and 280 are depicted as being carried out after steps 210-250, these steps can be carried out concurrently with those steps. For example, the field of view of the camera of the PWD and/or the position of the PWD can continuously be tracked and the annotation graphic can be updated accordingly. Also, the remote assistance session may be ended prior to or during any of those steps 210-270 and, thus, in such a case the method 200 may end.

In step 280, it is determined whether the remote assistance session has ended or is being ended. In one embodiment, the session can be ended by the vehicle user (or PWD user) or the remote assistant pressing an "End Session" button or similar button on the graphical user interface (GUI) of the vehicle assistance application 16 or the remote assistant application 84. The method 200 then ends.

Figure 6:
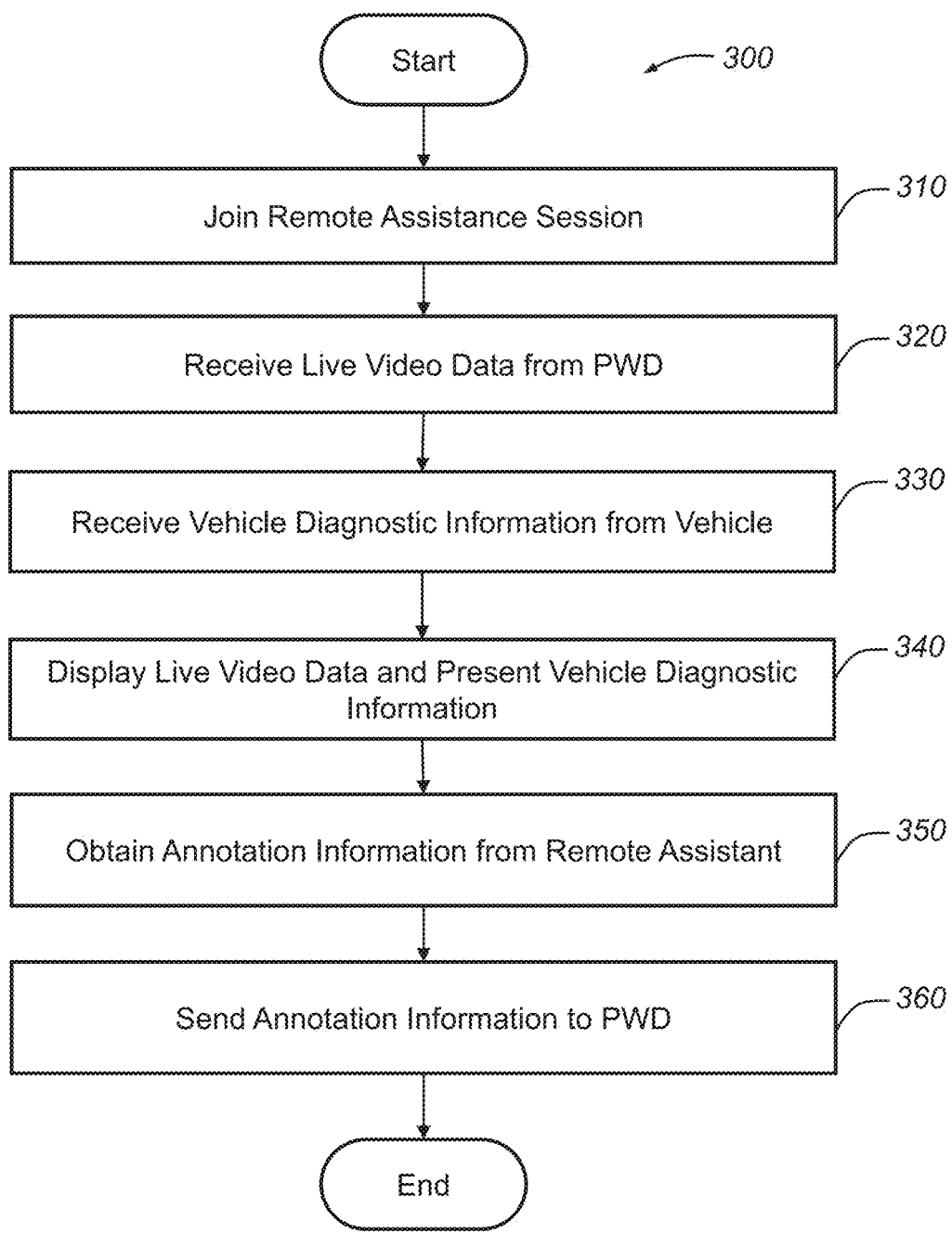
FIG. 6 is a flowchart depicting another embodiment of a method of providing augmented reality (AR) remote assistance to a vehicle user of a vehicle.

With reference to FIG. 6, there is shown an embodiment of a method 300 of providing an augment reality (AR) remote assistance to a vehicle user of a vehicle. In one embodiment, the method 300 can be carried out by a remote computer, such as remote computer 82 at the remote facility 80. Although the steps of the method 300 are described as being carried out in a particular order, it is hereby contemplated that the steps of the method 300 can be carried out in any suitable order as will be appreciated by those skilled in the art.

The method 300 begins with step 310, wherein a portable wireless device (PWD) joins a remote assistance session with a remote assistant application. This step is analogous to step 210 of the method 200 (FIG. 5) as discussed above and, thus, the discussion of step 210 is incorporated herein. The method 300 continues to step 320.

In step 320, live video data is received at the remote assistant application from the portable wireless device (PWD). In at least one embodiment, this step is the corollary of step 230 of the method 200 (FIG. 5). The live video data can be captured using camera 120 and/or camera 122 of the PWD 14 and then sent or streamed to the remote assistant application 84. The remote assistant application 84 can present a graphical user interface (GUI) that includes a live video data streaming portion in which the received live video data is displayed in a streaming (or live) fashion. The live video data can thus be presented at the time in which the live video data is received. In one embodiment, the live video data can include both images and sound (or audio) that is streamed in a live fashion. The method 300 continues to step 330.

In step 330, vehicle diagnostic information is received from the vehicle. In one embodiment, the vehicle diagnostic information is received over a remote connection between the remote assistant application 84 and the vehicle electronics 20. The remote connection can be a direct connection, which refers to a connection between the vehicle electronics 20 and the remote assistant application 84 (or remote computer 82) that does not use the PWD 14 as part of the communication path. For example, the PWD 14 can inform the remote assistant application 84 of a particular vehicle that the PWD 14 is associated with by sending the remote assistant application 84 a vehicle identifier or other information that can be used to identify the vehicle (e.g., vehicle user subscriber information that can be used by a remote facility to identify vehicle(s) associated with the vehicle user subscriber account). The remote assistant application 84 can then connect to the vehicle electronics 20 via the land network 76 and/or the cellular carrier network 70. A request for vehicle diagnostic information (i.e., a vehicle diagnostic information request) or other vehicle information can be sent from the remote assistant application 84 to the vehicle electronics 20 via the remote connection. The vehicle electronics 20 can then respond by obtaining vehicle diagnostic information (e.g., DTCs) from one or more VSMs and then sending this information to the remote assistant application 84 as a part of a vehicle diagnostic information response.

In another embodiment, the vehicle diagnostic information can be obtained by the PWD 14 and then sent from the PWD 14 to the remote assistant application 84. For example, as a part of (or in response to) joining the remote assistance session, the PWD 14 can send a vehicle diagnostic information request to the vehicle electronics 20 via a SRWC connection and, in response, the vehicle electronics 20 can send the requested vehicle diagnostic information to the PWD 14. This vehicle diagnostic information response received at the PWD 14 from the vehicle electronics 20 via the SRWC connection can then be forwarded to the remote assistant application 84. In another embodiment, the remote assistant application 84 can generate and send the vehicle diagnostic information request to the PWD 14 and then the PWD 14 can send this vehicle diagnostic information request (or another request based thereon) to the vehicle electronics 20. The vehicle diagnostic information response can then be received at the PWD 14 and forwarded to the remote assistant application 84 (or the vehicle diagnostic information response can be directly sent from the vehicle electronics 20 to the remote assistant application 84 via a remote connection between the vehicle electronics 20 and the remote assistant application 84). The method 300 then continues to step 340.

In step 340, the live video data is displayed and the vehicle diagnostic information is presented at the remote assistant application. As mentioned above, the live video data can be displayed in a live streaming fashion at a live video data streaming portion of the GUI of the remote assistant application 84. Also, the live video data can include (or be accompanied with) sound (or audio) data that is captured by the PWD 14 using the microphone 132. This sound data can be presented to the remote assistant using a speaker at the remote computer 82. Additionally, the vehicle diagnostic information can be presented to the remote assistant using the GUI of the remote assistant application 84. Also, or alternatively, the vehicle diagnostic information can be presented using the speaker at the remote computer 82 through use of natural language generation or other text-to-audio techniques as appreciated by those skilled in the art. The method 300 continues to step 350.

In step 350, annotation information is obtained from the remote assistant. The remote assistant is the user of the remote assistant application 84. The remote assistant can use a human-machine interface (e.g., keyboard, mouse, touchscreen) at the remote computer 82 to provide an annotation input into the remote assistant application 84. The annotation input can indicate a type of graphic, a color, a position of the annotation, and/or various other information pertaining to the annotation. The annotation input can be used to generate annotation information that includes information that identifies an annotation graphic and an annotation graphic location or annotation location information. The annotation graphic can be created or generated by the remote assistant using annotation tools (e.g., a paintbrush allowing the remote assistant to draw on the live video data) or may be selected from a predefined set of annotation graphics (e.g., previously generated images). The annotation graphic can be positioned at a particular location on the live video data and the remote computer 82 and/or the remote assistant application 84 can determine annotation location information.

In one embodiment, the annotation location information can include an annotation graphic location (e.g., a pixel coordinate location) on the live video data. Additionally, or alternatively, the annotation location information can include object marker information that identifies an object (or location) within the three-dimensional space as captured by camera 120, 122 of the PWD 14 and as represented in the live video data. For example, the remote assistant can place an annotation graphic at an area or point within the live video data at which an oil cap appears. The oil cap can be identified as an oil cap of the vehicle 12 using object recognition techniques (or other image processing techniques) as appreciated by those skilled in the art. Then, the annotation location information (or object marker information) can be generated or otherwise obtained (e.g., recalled from a database) that is usable by the PWD 14 to identify the oil cap using object recognition techniques (or other image processing techniques). In one embodiment, once the oil cap is identified (e.g., identified as an oil cap) the object marker information can be recalled from a database at the remote facility 80. In one embodiment, the object marker information can be included in the annotation location information along with an annotation graphic location (e.g., a pixel coordinate location). The annotation information can also include a timestamp (or other time indicator) so that the PWD 14 can be informed of the live video data in which the annotation was generated or configured. The method 300 continues to step 360.

In step 360, the annotation information is sent to the PWD. The annotation information can be sent from the remote assistant application 84 to the PWD 14 via the land network 76 and/or the cellular carrier system 70. The annotation information can be packaged into a single packet (or data unit) for transmission or may be packaged into multiple packets (or data units) for transmission. Steps 320 through 330 can continuously be carried out until the session is ended, such as is described above with respect to step 280 of the method 200 (FIG. 5). For example, the live video data can continuously be received in a streaming manner for the entirety of the session (or until the remote assistant or vehicle user indicates to terminate the live video data). Additionally, vehicle diagnostic information can be requested by the remote assistant using the remote assistant application 84 at any time during the session, at least in one embodiment. Also, the remote assistant can clear, modify, add, or otherwise change the annotations (or annotation graphics) that are presented at the PWD 14. When the session is terminated, the method 300 then ends.

With reference to FIG. 7, there is shown an embodiment of a method 400 of providing augmented reality (AR) remote assistance to a vehicle user of a vehicle. In one embodiment, the method 400 can be carried out by remote computer 82 at the remote facility 80, the vehicle electronics 20, and/or the PWD 14. Although the steps of the method 400 are described as being carried out in a particular order, it is hereby contemplated that the steps of the method 400 can be carried out in any suitable order as will be appreciated by those skilled in the art.

The method 400 begins with step 405 wherein a remote assistance session is established between the PWD 14 and the remote assistant application 84 (or the remote computer 82). This step is described above with respect to step 210 of the method 200 (FIG. 5). Then, at step 410, the PWD 14 sends a vehicle information request (e.g., vehicle diagnostic information request) to the vehicle electronics 20 via a SRWC connection (e.g., Bluetooth™) and, at step 415, the vehicle electronics 20 responds by providing a vehicle information response that includes the requested information to the PWD 14. At step 420, the vehicle information response is sent from the PWD 14 to the remote assistant application 84. As mentioned above, in other embodiments, the remote assistant application 84 can directly request the vehicle information (e.g., vehicle diagnostic information) from the vehicle electronics 20 via a remote connection between the vehicle electronics 20 and the remote computer 82.

In step 425, the vehicle monitors or track movement of the PWD 14, which can be accomplished, in one embodiment, through use of inertial sensor(s) 140. Orientation information can be set to initial orientation value(s), which can be referred to as initial orientation information. Also, movement information can be set to initial movement value(s), which can be referred to as initial movement information. It should be appreciated that the movement information and the orientation information can or may be represented in conjunction with one another and may not be stored or recorded separate from one another. The position information can then be updated as the PWD 14 is moved or re-oriented and stored in memory 104 of the PWD 14. At step 430, the PWD 14 can begin to capture live video data and this live video data can be stored at memory 104 (in some embodiments). The live video data can include visual data captured by the cameras 120,122 of the PWD 14 and, in some embodiments, can further include audio or sound data captured by microphone 132. At step 435, the live video data is sent to the remote assistant application 84 and then displayed at step 445. Steps 430, 435, and 445 can continuously be carried out so that the live video data captured by the PWD 14 is continuously streamed to the GUI at the remote assistant application 84. At step 440, which can occur at or around the same time as step 435, position information is stored to memory—this information can be obtained using inertial sensor(s) 140 of the PWD 14, for example. In one embodiment, this step can include merely setting the initial position information (i.e., initial orientation information and/or initial movement information), which can be stored in memory 104.

At step 450, the remote assistant provides annotation input to the remote assistant application 84. Then, annotation information can be generated or otherwise obtained at the remote assistant application 84 and based on the annotation input. This annotation information can then be sent to the PWD 14 at step 455. The annotation information can be used to present an annotation graphic at the display 130 of the PWD 14 in an augmented reality (AR) fashion such that the annotation graphic is displayed over a portion of the live video data—this live video data with a superimposed or an overlaid annotation graphic can be referred to as an AR video. As mentioned above, the annotation graphic can be locked, anchored, or fixed to an object within the three-dimensional space as captured by the camera 120,122. In step 465, the PWD 14 detects a change in position (i.e., movement, a change in orientation) of the PWD 14. This change can be tracked and recorded by the PWD 14 using the inertial sensor(s) 140 (e.g., accelerometer, gyroscope) and then stored in memory 104. Then, in step 470, the AR video can be updated by determining an updated annotation graphic location and/or annotation graphic orientation. The updated AR video is then displayed on the display 130. The method 400 can then end once the session ends (as described in step 280 of the method 200 (FIG. 5)), for example.

In one embodiment, the method 200, the method 300, and/or the method 400 can further include a step of providing live video data from the remote assistant application 84 (or remote computer 82) to the PWD 14. For example, a camera and/or microphone at the remote computer 82 can record video and/or audio of the remote assistant and this live video data of the remote assistant can be provided to the PWD 14 so that the remote assistant can provide audible instructions or other communications to the remote assistant. Moreover, providing a live video of the remote assistant can provide for a more personal and/or engaging experience for the vehicle user. Additionally, hand gestures and/or other body language can be used by the remote assistant and observed by the vehicle user so as to facilitate assistance with the vehicle. And, in one embodiment, the front facing camera 120 can capture live video data of the vehicle user so that the remote assistant can see the vehicle user, which can contribute or facilitate communications between the remote assistant and vehicle user. In a particular embodiment, live video data can be captured simultaneously by both the front-facing camera 120 and the rear-facing camera 122 of the PWD 14—both live video data streams can be sent to the remote assistant application 84 and streamed in a live manner.

In one embodiment, the method 200, the method 300, and/or the method 400 can further include a step of recording the remote assistance session. For example, the AR video (including the live video data and/or audio) and the annotation graphic can be recorded at the PWD 14 and stored in memory 104. The recorded AR video can then be played back at the PWD 14 at a later time, such as at a time after the remote assistance session has ended so that the vehicle user can review the instructions, guidance, or other communications provided by the remote assistant. This recorded AR video can be stored in memory 104 of the PWD 14. Likewise, the live video data of the remote assistant can be recorded and stored at memory of the remote computer 82 or a database (or other memory) at the remote facility 80. This live video data of the remote assistant and/or the AR video (or live video data of the PWD 14) can be reviewed later for quality assurance purposes, for example.

In one embodiment, the method 200, the method 300, and/or the method 400 can include generating and sending AR video at the remote assistant application 84 (or remote computer 82) and then sending the AR video to the PWD 14 for presentation on the display 130. In this way, the AR processing is carried out at the remote facility (e.g., remote computer 82 or other remote computer) to create an AR video that is then sent back to the PWD 14.

In one embodiment, the method 200, the method 300, and/or the method 400 can include sending media content to the PWD 14 from the remote assistant application 84. This media content can include pre-recorded videos, troubleshooting guide, an operator or vehicle manual, webpages or websites (or URLs, links, etc.), images, or other assisting text, graphics, or content.

Figure 8:
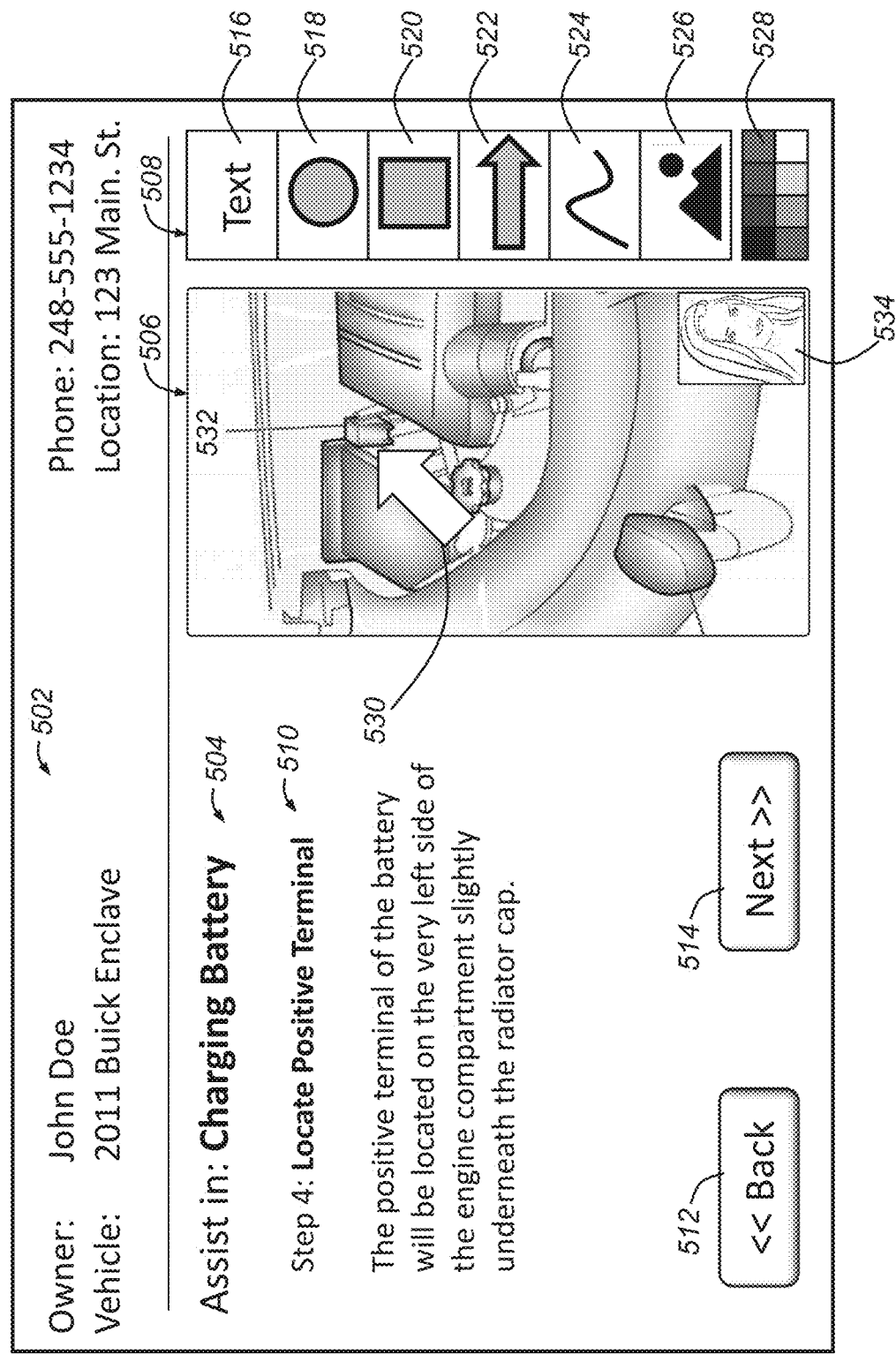
FIG. 8 is a block diagram depicting a graphical user interface (GUI) of a remote assistant application.

With reference to FIG. 8, there is shown a graphical user interface (GUI) 500 for a remote assistant application, such as the remote assistant application 84 that is executed on remote computer 82 at the remote facility 80. The GUI 500 includes a vehicle information portion 502, a vehicle operation or service guide portion 504 (referred to also as a vehicle guide portion 504), a live video data streaming portion 506, and an annotation configuration portion 508. The vehicle information portion 502 can display information pertaining to the vehicle 12 as well as to the vehicle user (or the user of the PWD 14 or application 16). For example, the vehicle information portion 502 includes an owner (or user) name ("John Doe"), a phone number for the vehicle user, vehicle identifying information that is shown as describing the model year of the vehicle ("2011 Buick Enclave"), and a location of the vehicle and/or a location of the PWD 14 (e.g., "1234 Main St."). Other vehicle information can be presented in this area, another area, or on another screen of the GUI. For example, vehicle diagnostic information can be presented to the remote assistant using another screen of the GUI or on the same screen so that the remote assistant can troubleshoot problems with the vehicle 12 or otherwise evaluate the vehicle operation or its conditions. The remote assistant can then identify a problem or a troubleshooting guide to use for assisting the vehicle user with the vehicle 12.

In the vehicle guide portion 504, a step-by-step guide or manual can be presented to the remote assistant and used to aid the remote assistant in providing assistance or service to the vehicle user via the remote assistance session. The remote assistant can select a problem, a troubleshooting guide, an operator or vehicle manual, or other assisting text or graphics that can be presented to the remote assistant. For example, the remote assistant can select to be assisted with "Charging Battery", which can be used for assisting a vehicle user in charging or jumping the vehicle battery when the battery is dead or out of charge, for example. The vehicle guide portion 504 can present steps in an explanatory step portion 510 that can be navigated by the remote assistant using buttons 512 and 514, which are can be "Back" and "Next" buttons to navigate between the steps. In one example, the vehicle guide portion 504 can read "Assist in: Charging Battery, Step 4: Locate Positive Terminal. The positive terminal of the battery will be located on the very left side of the engine compartment slightly underneath the radiator cap."

The live video data streaming portion 506 displays live video data that is received from the PWD 14, such as is described in step 320 and 340 of the method 300 (FIG. 6). The annotation configuration portion 508 can include one or more annotation tools or configuration options 516-528 that can be selected and used by the remote assistant for annotating the live video data. In the illustrated embodiment, the user can select a text tool 516 that allows the remote assistant to annotate the live video data with text, which can be input using a keyboard or a microphone along with voice recognition software at the remote computer 82. The annotation configuration portion 508 of FIG. 8 also includes a circle tool 518 that can be used to create a circle or oval on the live video data, a rectangle tool 520 that can be used to create a square or rectangle on the live video data, and an arrow tool 522 that can be used to create an arrow on the live video data. Also, the annotation configuration portion 508 of FIG. 8 also includes a paintbrush or pencil tool 524 that can be used to draw on the live video data and a preset graphic tool 526 that allows the remote assistant to select an image or graphic from memory (or a database) that can be used to annotate the live video data. Additionally, the annotation configuration portion 508 of FIG. 8 includes a color selector 528 that allows the remote assistant to change the color of the annotation graphic, which can be text, a circle or oval, a rectangle, an arrow, free-form drawing, or predefined graphic or image, as discussed above. Moreover, the circle or oval, the rectangle, and/or the arrow can be configured to include different line or fill colors, and, in some embodiments, the line or the fill can be set to "no fill" (or transparent). In one example, when the preset graphic tool 526 is selected, a list of predefined graphics can be displayed at the GUI 500 and the remote assistant can select one of the predefined graphics. In one embodiment, the annotation graphic can be a three-dimensional shape or object that is predefined and that can be selected by the remote assistant using, for example, the preset graphic tool 526. And, in one embodiment, the annotation graphic can be an animation or a moving image (or video), such as a Graphics Interchange Format (GIF) image/animation.

In the illustrated embodiment of FIG. 8, the remote assistant has added an arrow annotation graphic 530 that is pointing to a positive terminal 532 of a battery in the live video data. According to one scenario of one embodiment, the remote assistant can press the arrow tool 522 and then touch (or otherwise indicate) (e.g., using a touch on a touch-screen, a mouse, a keyboard) a point or area on the live video data, such as the point in which the object of interest is located, which is the positive terminal 532. The remote assistant can then reorient or rotate the annotation graphic (e.g., the arrow 530), resize the graphic, otherwise modify or configure the graphic, and/or move or reposition the annotation graphic using touch on a touch-screen, a mouse, a keyboard, or other human-machine interface. The annotation graphic can be sent to the PWD 14, such as is described in step 360 of the method 300 (FIG. 6) and/or step 455 of the method 400 (FIG. 7).

As mentioned above, in one embodiment, the remote assistant can select a point on the live video data and, then, the remote assistant application 84 can recognize an object at this selected point. Object marker information of the recognized object can be recalled from memory (or a database) and then sent to the PWD 14, so that the PWD 14 can use object recognition techniques to track the object within the live video data as the PWD 14 is repositioned—in this way, the annotation graphic can track and be fixed to the object (e.g., the positive terminal 522) even as the field of view of the camera 120,122 moves so as to provide an augmented reality (AR) video.

In one embodiment, including the illustrated embodiment, the live video data streaming portion 506 can include an additional live video streaming portion 534. The additional live video streaming portion 534 can be used to present live video data of the remote assistant so that, for example, the remote assistant can be sure the vehicle user can see the remote assistant within the live video data or so that the live video data includes a field of view as desired by the remote assistant. Or, the additional live video streaming portion 534 can include live video data of the vehicle user (as captured by front-facing camera 120) so that the remote assistant can see both the vehicle 12 (as shown in the main portion of the live video data streaming portion 506) and the vehicle user simultaneously. And, in another embodiment, the live video data streaming portion 506 can include multiple additional live video streaming portions 534 so that all three live video data streams can be viewed simultaneously.

Figure 9:
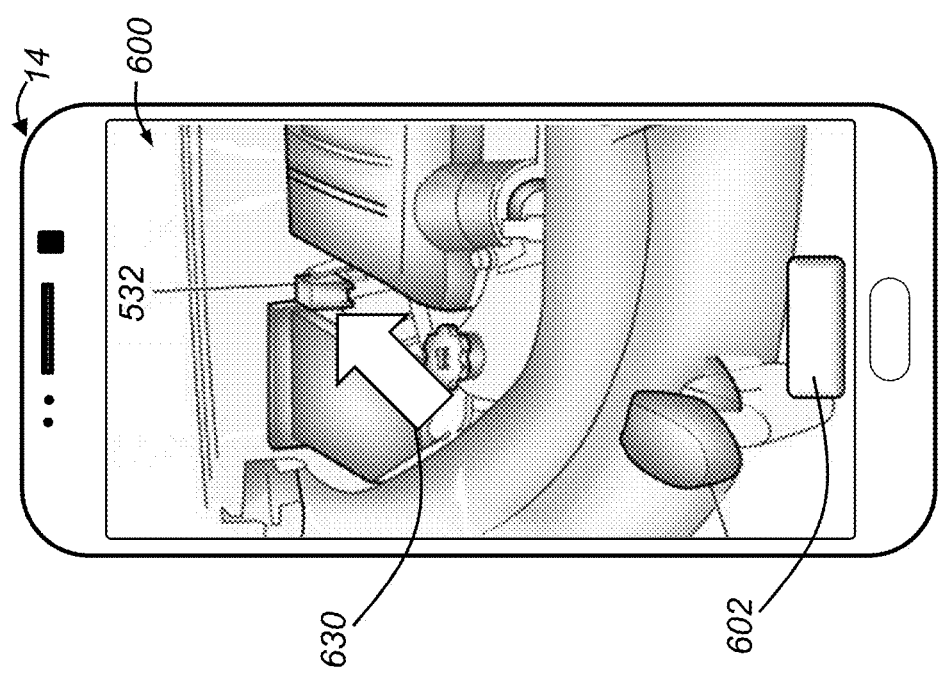
FIG. 9 is a block diagram depicting a graphical user interface (GUI) of a vehicle assistance application.

With reference to FIG. 9, there is shown a graphical user interface (GUI) 600 for a vehicle assistance application, such as the vehicle assistance application 16. The GUI 600 of the vehicle assistance application 16 can stream the live video data and can render one or more annotation graphics (only one shown at 630) that are configured by the remote assistant using the remote assistant application 84. The arrow annotation graphic 630 corresponds to the arrow annotation graphic 530 (FIG. 8) that was configured by the remote assistant. The arrow annotation graphic 630 (and 530) can be updated as the PWD 14 or field of view of the camera 122 changes using AR processing techniques as appreciated by those skilled in the art. The GUI 600 can include a button 602 that can be used to end the remote assistance session, to navigate the GUI 600 to another screen, or to carry out another task for the vehicle assistance application 16. Additionally, in some embodiments, the GUI 600 can include one or more additional live video streaming portions, such as those discussed above with respect to the GUI 500 of the remote assistant application 84.

In one embodiment, the method 200, method 300, the method 400, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory at remote computers 82, memory 104 of the PWD 14, memory 38), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of providing augmented reality (AR) remote assistance to a vehicle user of a vehicle, the method comprising:
   sending identification information of a vehicle from a portable wireless device (PWD) that is located at the vehicle to a remote assistant application at a remote facility having at least one remote computer;
   sending live video data from the PWD at the vehicle to the remote assistant application, wherein the PWD includes an electronic display and an electronic camera that captures the live video data within a field of view of the electronic camera, and wherein the at least one remote computer is configured to:
      receive the identification information from the PWD,
      identify a vehicle based on the received identification information,
      in response to identifying the vehicle, send a vehicle diagnostic information request to the identified vehicle,
      in response to sending the vehicle diagnostic information request to the identified vehicle, receive a vehicle diagnostic information response from the identified vehicle via a direct remote connection between the vehicle and the at least one remote computer, wherein the vehicle diagnostic information response includes vehicle diagnostic information concerning the identified vehicle,
      present the vehicle diagnostic information to a remote assistant,
      display the live video data for viewing by the remote assistant using the remote assistant application,
      receive an annotation input from the remote assistant, and
      send annotation information to the PWD, wherein the annotation information is based on the annotation input;
   receiving the annotation information at the PWD from the remote assistant application, wherein the annotation information includes annotation graphic information and annotation location information, wherein the annotation graphic information identifies an annotation graphic, and wherein the annotation location information identifies an annotation display location; and
   displaying on the electronic display an augmented reality (AR) video that includes the annotation graphic located at the annotation display location and over a portion of the live video data, wherein the AR video is updated as the field of view of the electronic camera changes so that the annotation graphic as displayed within the AR video appears fixed to a location within the field of view of the electronic camera.

2. The method of claim 1, wherein the annotation location information includes object marker information that is used to identify and/or track an object in three-dimensional space as observed by the electronic camera of the PWD so that the annotation graphic can be fixed to the object to provide the AR video.

3. The method of claim 1, wherein the annotation location information includes a pixel coordinate location of the live video data.

4. The method of claim 3, wherein the PWD identifies an object within three-dimensional space as observed by the electronic camera of the PWD, and wherein the PWD uses object recognition techniques to track the annotation graphic so that the annotation graphic appears fixed to the object.

5. The method of claim 3, wherein the PWD includes one or more inertial sensors that obtain position information concerning the PWD and wherein the position information is used to track an object or point within three-dimensional space as observed by the electronic camera of the PWD so that the annotation graphic appears fixed to the object or point within the three-dimensional space even as the PWD is repositioned.

6. The method of claim 5, wherein the position information includes orientation information and/or movement information concerning the PWD.

7. The method of claim 1, wherein live audio is streamed to the PWD from the at least one remote computer, and wherein the live audio is captured by the at least one remote computer using a microphone and streamed for playback at the PWD.

8. The method of claim 7, further comprising the step of displaying remote assistant live video data that is received from the at least one remote computer, wherein the remote assistant live video data is video data that is captured at the at least one remote computer and streamed in a live manner to the PWD for playback.

9. The method of claim 1, further comprising the vehicle user providing the remote assistant with access to vehicle electronics of the identified vehicle via an application of the PWD so as to obtain the vehicle diagnostic information.

10. A method of providing augmented reality (AR) remote assistance to a vehicle user of a vehicle, wherein the method is carried out by at least one remote computer that includes a remote assistant application, and wherein the method comprises:
   receiving identification information of a vehicle from a portable wireless device (PWD);
   identifying a vehicle based on the received identification information;
   in response to identifying the vehicle, sending a vehicle diagnostic information request to the identified vehicle via a direct remote connection between the vehicle and the at least one remote computer;
   in response to sending the vehicle diagnostic information request to the identified vehicle, receiving a vehicle diagnostic information response from the identified vehicle, wherein the vehicle diagnostic information response includes vehicle diagnostic information concerning the identified vehicle;
   receiving live video data at the remote assistant application from the PWD;
   displaying the live video data at a graphical user interface (GUI) of the remote assistant application so that live video data captured at the PWD is received and displayed at the GUI of the remote assistant application;
   presenting the vehicle diagnostic information at the GUI of the remote assistant application;
   receiving an annotation input from a remote assistant via one or more human-machine interfaces at the at least one remote computer;
   obtaining annotation information based on the annotation input;
   displaying an augmented reality (AR) video at the GUI of the remote assistant application, and wherein the AR video includes an annotation graphic that is generated based on the annotation information and/or the annotation input; and
   sending the annotation information and/or the AR video to the PWD.

11. The method of claim 10, wherein the sending step causes the AR video to be displayed on an electronic display of the PWD such that the AR video is displayed on the GUI of the remote assistant application and the electronic display of the PWD in a simultaneous manner.

12. The method of claim 10, wherein the vehicle diagnostic information is presented and the live video data is displayed at the GUI of the remote assistant application simultaneously.

13. The method of claim 10, wherein the GUI of the remote assistant application includes a live video data streaming portion, a vehicle operation or service guide portion, and one or more annotation tools, wherein the live video data and/or the AR video is displayed at the live video data streaming portion, wherein a vehicle operation or service guide is displayed at the vehicle operation or service guide portion, and wherein the annotation tools are selectable by the remote assistant and usable to input the annotation input.

14. The method of claim 10, wherein the AR video is generated at the at least one remote computer using object recognition techniques, and wherein the AR video includes the live video data received from the PWD and the annotation graphic overlaid or superimposed on a portion of the live video data.

15. The method of claim 14, wherein the AR video is sent from the remote assistant application to the PWD.

16. The method of claim 10, wherein the annotation information is sent to the PWD, and further comprising the step of receiving the AR video from the PWD.

17. The method of claim 10, wherein the remote assistant application obtains the vehicle diagnostic information from the vehicle using the direct remote connection between the vehicle and the remote computer.

\* \* \* \* \*